United States Patent
Peterson et al.

(10) Patent No.: US 6,261,185 B1
(45) Date of Patent: Jul. 17, 2001

(54) MEANS FOR COUPLING A DRIVE SHAFT TO A ROTATABLE MEMBER AND THE METHOD OF DOING THE SAME

(75) Inventors: Gary G. Peterson; Adam R. Menze, both of Fargo, ND (US); Warren A. Ehrichs; Thor Iverson, both of Moorhead, MN (US), executor of said Warren A. Ehrichs, deceased

(73) Assignee: Amity Technology, Inc., Fargo, ND (US)

( * ) Notice: Subject to any disclaimer, the term of this patent is extended or adjusted under 35 U.S.C. 154(b) by 0 days.

(21) Appl. No.: 09/189,734

(22) Filed: Nov. 10, 1998

(51) Int. Cl.[7] ........................................................ F16C 3/00
(52) U.S. Cl. ............................ 464/182; 460/30; 460/130; 403/371; 403/370
(58) Field of Search .............................. 464/182; 403/369, 403/371, 370, 368, 374.4, 374.3, 374.2, 373; 460/30, 130, 132, 140

(56) References Cited

U.S. PATENT DOCUMENTS

| | | | |
|---|---|---|---|
| 4,345,851 | * | 8/1982 | Soussloff ................................ 403/369 |
| 4,600,334 | * | 7/1986 | Soussloff ................................ 403/369 |
| 4,623,277 | * | 11/1986 | Wayne et al. ......................... 403/371 |
| 4,798,248 | * | 1/1989 | Schwitters ................................. 171/1 |
| 4,824,281 | * | 4/1989 | Katsube ................................ 403/370 |
| 5,172,539 | * | 12/1992 | Jennings et al. ............................ 56/6 |
| 5,372,546 | * | 12/1994 | Brakke ................................. 460/132 |
| 5,387,155 | * | 2/1995 | Dietz ................................... 460/132 |
| 5,474,403 | * | 12/1995 | Hetrich ................................ 403/369 |

* cited by examiner

Primary Examiner—Lynne H. Browne
Assistant Examiner—Aaron Dunwoody
(74) Attorney, Agent, or Firm—Michael S. Neustel

(57) ABSTRACT

To couple a drive shaft to a rotatable member for rotation therewith and the method of doing so includes providing a rotatable member having at least one end with a bore therein, a drive shaft, and an expandable and compressible coupler having a first segmented sleeve and a second segmented sleeve. The coupler is positioned within the bore of the rotatable member and the drive shaft is extended within a bore of the coupler and is coaxially disposed relative to the rotatable member. Without having to bolt or weld the drive shaft to the rotatable member, the user securely couples drive shaft to the rotatable member and substantially prevents removal of the drive shaft from the rotatable member by the user simply threading the first segmented sleeve into the second segmented sleeve thus simultaneously effecting engagement of the coupler within the bore of the rotatable member and substantially clamping or compressing of the coupler about the drive shaft.

14 Claims, 3 Drawing Sheets

MEANS FOR COUPLING A DRIVE SHAFT TO A ROTATABLE MEMBER AND THE METHOD OF DOING THE SAME

BACKGROUND OF THE INVENTION

This invention includes a means for coupling a drive shaft to a rotatable member and the method of doing the same.

In most instances, drive shafts which are used to drive other elements such as a rotatable members are either fastened to the rotatable members with bolts, screws, and locking keys as such or fixedly attached to the rotatable members by being welded directly to the rotatable members, thus making it very difficult for the user to replace or repair either the rotatable members or the drive shafts, and most often the users only option is to replace both the drive shafts and the rotatable member. With the present invention, the user can not only quickly and easily repair or replace the broken element being either the drive shaft or the rotatable member but can do so without having to replace both the rotatable member and the drive shaft. In addition, with the present invention, the user can couple the drive shaft to the rotatable member more easily and conveniently than using any of the conventional methods.

SUMMARY OF THE INVENTION

The present invention is a means for coupling a drive shaft to a rotatable member and the method of doing the same which includes a shaft, a rotatable member having a circumference larger than that of the shaft and having at least one end through which at least a portion of the shaft is securely disposed and a coupling member which is compressedly mounted about the shaft and which is also expandedly mounted within the rotatable member to securely and rigidly couple the shaft to the rotatable member. The method of coupling the drive shaft to the rotatable member includes providing a drive shaft such as a stub shaft having a pre-determined circumference and also providing a rotatable member having an end with a bore therein and further providing a coupler, and also includes positioning the coupler in the bore at the end of the rotatable member and extending an end portion of the drive shaft in the coupler and substantially securing the coupler about the drive shaft and within the bore of the rotatable member such that the rotatable member rotates with the drive shaft.

One objective of the present invention is to provide a means for coupling a drive shaft to a rotatable member which substantially reduces the cost and time for repair since the user can easily remove the drive shaft from the coupler and the coupler from the rotatable member without either having to undo fasteners or using a cutting device to remove the drive shaft.

Another objective of the present invention is to provide a means for coupling a drive shaft to a rotatable member which allows the user to only have to repair or replace the immediate damaged component without having to replace or repair all the components.

Further objectives and advantages of the present invention will become apparent as the description proceeds and when taken in conjunction with the accompanying drawings wherein:

DETAILED DESCRIPTION OF THE INVENTION

Figure 1:
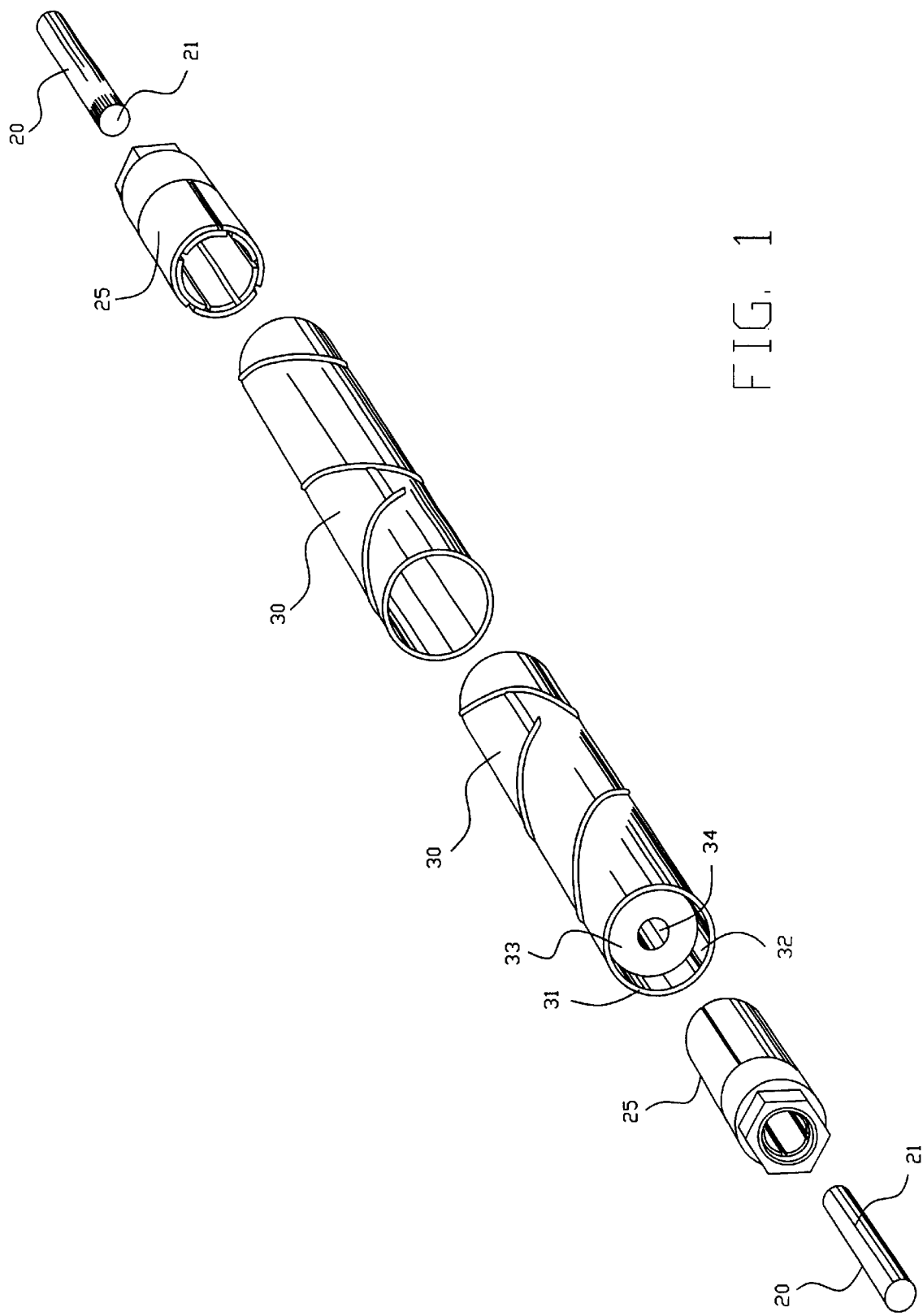
FIG. 1 is an exploded perspective view of the means for coupling a drive shaft to a rotatable member.
Figure 2:
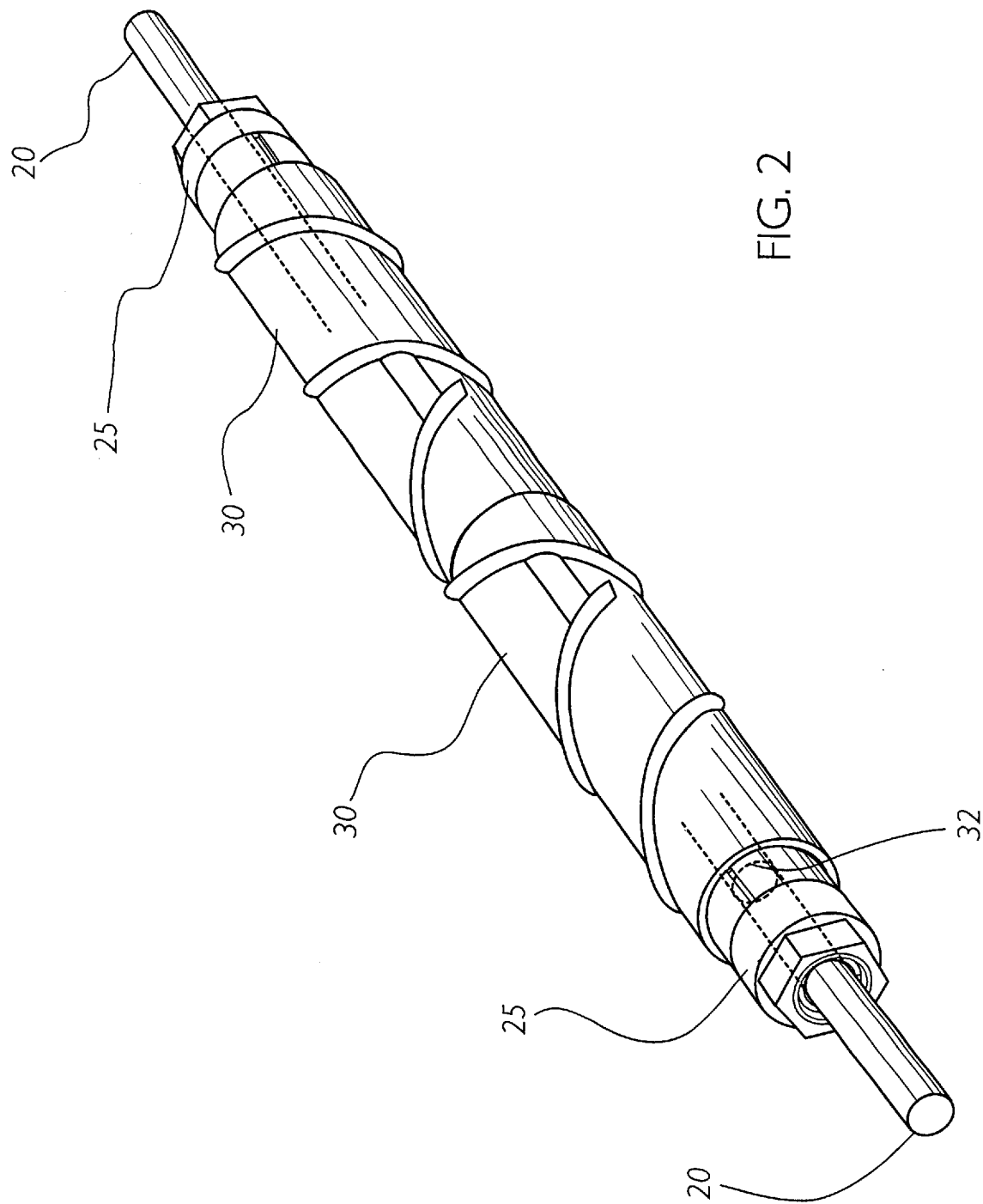
FIG. 2 is a perspective view of the means for coupling a drive shaft to a rotatable member in operation.
Figure 3:
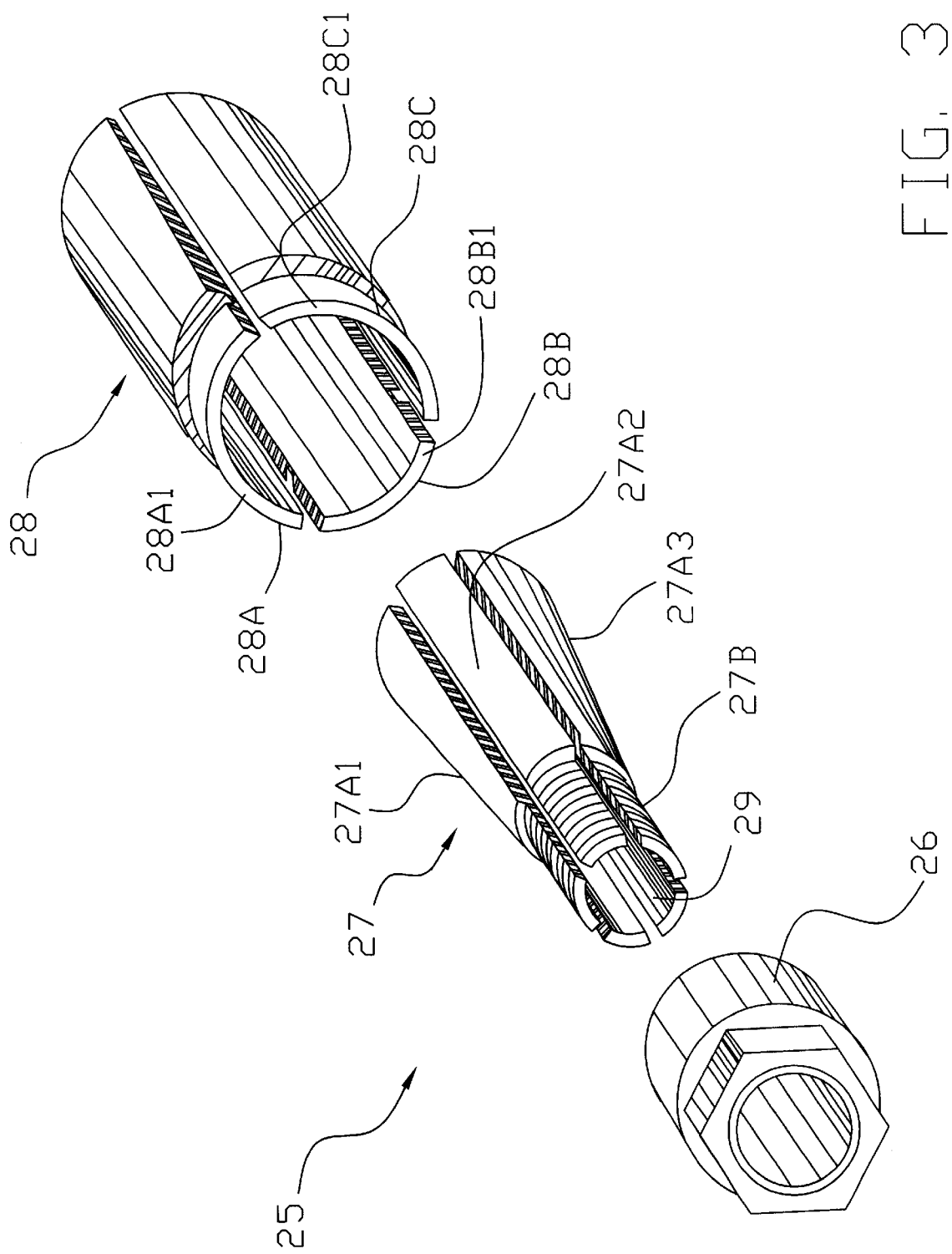
FIG. 3 is an exploded detail perspective view of the coupler.

Referring to the drawings in FIGS. 1–3, in particular, the means for coupling a drive shaft 20 to a rotatable member 30 and the method of doing the same comprises a rotatable member 30 having at least one end 31 with a cylindrical bore 32 and an inner bore 34 therein, and further comprises a drive shaft 20 preferably a stub shaft 20 having at least one end portion 21 and having a circumference relatively smaller than the circumference of the inner bore 34 of the rotatable member 30 and capable of being extended and coaxially disposed in the inner bore 34 through at least one end 31 of the rotatable member 30, and also comprises a conventional expandable and compressible coupler 25 having a first segmented sleeve 27 with an externally threaded part 27B at one end thereof and an externally tapered part 27A1–3 at the other end with the tapered part 27A1–3 having a plurality of arc-shaped segments integrally disposed in a circumferential pattern in relationship with one another, the first segmented sleeve 27 further having a straight bore 29 extending therethrough and being adapted to receive at least an end portion 21 of the drive shaft 20. The conventional expandable and compressible coupler 25 also includes a second segmented sleeve having an internally threaded fastening part 26 and further having separate expansion parts in the form of movable arc members 28A–C each of which has a lateral flange 28A1, 28B1, 28C1 near a bottom end thereof. The movable arc members 28A–C are mounted and secured to the threaded fastening part 26 by means of the flanges 28A1, 28B1, 28C1 being received in an annular groove (not shown) disposed in the interior of the threaded fastening part 26. The first segmented sleeve 27 is threaded within the second segmented sleeve. The rotatable member 30 is preferably comprised of a cleaning roller 30 for a conventional sugar beet harvester having a tubular structure with a plurality of outer rib members as shown in FIGS. 1 and 2 of the drawings.

To expand the separate expansion parts of the second segmented sleeve and to compress the arc-shaped segments of the first segmented sleeve 27, the threaded fastening part 26 is threaded onto the externally threaded part 27B of the first segmented sleeve 27. The farther the fastening part 26 is threaded onto the externally threaded part 27B of the first segmented sleeve 27 and toward the tapered part 27A1–3, the more expanded the separate expansion parts become because the tapered part 27A1–3 tapers outwardly away from the threaded fastening part 26 and engagingly urges the separate expansion parts outwardly as the tapered part 27A1–3 is threaded farther into the second segmented sleeve. Generally simultaneously, the arc-shaped segments of the first segmented sleeve 27 compresses inwardly about the drive shaft 20.

In use, a bore 32 is formed in the at least one end 31 of the rotatable member 30 which is preferably a cleaning roll of a sugarbeet harvester, the bore 32 being dimensioned to receive the conventional expandable and compressible coupler 25 which is positioned in the bore 32 in the end 31 of the rotatable member 30 and against the terminal end 33 of the bore 32 with the expandable part 28 being disposed toward the terminal end 33 of the bore 32 and the threaded fastening part 26 being disposed to the open end of the rotatable member 30 so that the user can manipulate the threaded fastening part 26 to thread the second segmented sleeve either on or off the first segmented sleeve 27.

To securely couple the drive shaft 20 to the rotatable member 30 for rotation therewith without having to fasten or bolt or weld the drive shaft 20 directly to the rotatable member 30, at least an end portion 21 of the drive shaft 20 is extended within the cylindrical bore 32 of the first segmented sleeve 27 leaving a portion of the drive shaft 20 extending outwardly beyond the end 31 of the rotatable member 30, and the threaded fastening part 26 is threaded upon the externally threaded part 27B of the first segmented sleeve 27 toward the tapered part 27A1–3 thus urging the tapered part 27A1–3 within the second segmented sleeve. As the tapered part 27A1–3 is moved within the second segmented sleeve, the external surface of the tapered part 27A1–3 urges against the internal surface of the expandable part 28 or the arc members 28A–C causing the arc members 28A–C to expand outwardly with the external surface of the arc members 28A–C engaging the wall forming the bore 32 of the rotatable member 30. The farther the tapered part 27A1–3 is moved within the second segmented sleeve, the greater the expansion of the arc members 28A–C and the more engaged and unremovably secured the expandable and compressible coupler 25 becomes in the bore 32 of the rotatable member 30. Concurrently, the arc-shaped segments of the first segmented sleeve 27 are securely clamping, compressing or tightening about the drive shaft 20 thus unremovably securing the drive shaft 20 to the coupler 25 which is also now unremovably secured to the rotatable member 30 so that when the drive shaft 20 is energized, the rotatable member 30 will be driven and rotated by the drive shaft 20 even though the drive shaft 20 is not fastened or welded to the rotatable member 30. This process of coupling the drive shaft 20 to the rotatable member 30 makes it much easier and more convenient for the user to repair and replace either the drive shaft 20 or the rotatable member 30, and also is much more cost effective since the user doesn't have to replace both the drive shaft 20 and the rotatable member 30 if only one is broken.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A sugar beet harvester mounting device for coupling a drive shaft to a cleaning roller for a sugar beet harvester for rotation therewith comprising:
    a drive shaft;
    a cleaning roller for a sugar beet harvester having at least one end and having a bore within said end; and
    an expandable and compressible coupler being releaseably expanded and substantially secured within said bore and further being releaseably compressed and substantially secured about said drive shaft resulting in said drive shaft being secureably coupled to said cleaning roller for rotation thereof.

2. The sugar beet harvester mounting device for coupling a drive shaft to a cleaning roller for a sugar beet harvester for rotation therewith as described in claim 1, wherein said bore within said cleaning roller has a terminal end within said cleaning roller, said expandable and compressible coupler being disposed against said terminal end.

3. The sugar beet harvester mounting device for coupling a drive shaft to a cleaning roller for a sugar beet harvester for rotation therewith as described in claim 1, wherein said expandable and compressible coupler includes a first segmented sleeve and a second segmented sleeve.

4. The sugar beet harvester mounting device for coupling a drive shaft to a cleaning roller for a sugar beet harvester for rotation therewith as described in claim 3, wherein said first segmented sleeve has an externally threaded part at one end and an externally tapered part which is tapered outwardly away from said externally threaded part, and further has a bore extending therethrough, said bore of said first segmented sleeve being adapted to receive said drive shaft.

5. The sugar beet harvester mounting device for coupling a drive shaft to a cleaning roller for a sugar beet harvester for rotation therewith as described in claim 4, wherein said second segmented sleeve includes a threaded fastening part at one end thereof and an expandable part which has an external surface for being in substantial engagement in said bore of said cleaning roller, said first segmented sleeve being threaded within said second segmented sleeve.

6. The sugar beet harvester mounting device for coupling a drive shaft to a cleaning roller for a sugar beet harvester for rotation therewith as described in claim 5, wherein said expandable part includes a plurality of movable arc members supported by said threaded fastening member, said arc members being substantially engaged within said bore of said cleaning roller to substantially prevent the removal thereof.

7. A method of coupling a drive shaft to a cleaning roller for a sugar beet harvester for rotation therewith comprising the steps of:
    (a) providing a drive shaft comprised of a stub shaft, a cleaning roller for sugar beet harvester having at least one end and a bore through said at least one end, and an expandable and compressible coupler having a bore therethrough;
    (b) positioning said expandable and compressible coupler in said bore through said end of said cleaning roller;
    (c) extending said drive shaft in said bore of said expandable and compressible coupler; and
    (d) substantially securing said expandable and compressible coupler to said drive shaft and to said cleaning roller so that said cleaning roller rotates with said drive shaft to substantially prevent removal of said drive shaft from said cleaning roller.

8. The method of coupling a drive shaft to a cleaning roller for a sugar beet harvester for rotation therewith as described in claim 7, further includes providing said expandable and compressible coupler having a first segmented sleeve and a second segmented sleeve, said first segmented sleeve positioned within said second segmented sleeve, said bore of said expandable and compressible coupler extending through said first segmented sleeve.

9. The method of coupling a drive shaft to a cleaning roller for a sugar beet harvester for rotation therewith as described in claim 8, further includes providing said first segmented sleeve having an externally threaded part and an externally tapered part with movable arc-shaped segments, said second segmented sleeve having a threaded fastening part and an expandable part, said tapered part being tapered outwardly and away from said threaded fastening part.

10. The method of coupling a drive shaft to a cleaning roller for a sugar beet harvester for rotation therewith as described in claim 9, wherein the step of positioning said expandable and compressible coupler further includes exposing said threaded fastening part within said bore of said cleaning roller for easy and convenient access by a user so that the user can substantially secure said coupler to said drive shaft and to said cleaning roller.

11. The method of coupling a drive shaft to a cleaning roller for a sugar beet harvester for rotation therewith as described in claim 10, wherein the step of positioning said expandable and compressible coupler also includes coaxially positioning said drive shaft relative to said cleaning roller.

12. The method of coupling a drive shaft to a cleaning roller for a sugar beet harvester for rotation therewith as described in claim 10, wherein the step of substantially securing said expandable and compressible coupler further includes threading said threaded fastening member toward said tapered part thus effecting expanding of said expandable part securely against a wall forming said bore of said cleaning roller and compressing said tapered part securely about said drive shaft such that said rotatable member rotates with said drive shaft.

13. The method of coupling a drive shaft to a cleaning roller for a sugar beet harvester for rotation therewith as described in claim 12, wherein the step of substantially securing said expandable and compressible coupler also includes preventing removal of said drive shaft from said cleaning roller by substantially engaging said expandable and compressible coupler within said bore of said cleaning roller and by substantially clamping or engaging said expandable and compressible coupler about said drive shaft.

14. A method of coupling a drive shaft to a cleaning roller for a sugar beet harvester for rotation therewith comprising the steps of:

(a) providing a drive shaft comprised of a stub shaft, a cleaning roller for sugar beet harvester having at least one end and a bore through said at least one end, and an expandable and compressible coupler having a bore there through, (b) positioning said expandable and compressible coupler in said bore through said end of said cleaning roller;

(c) extending said drive shaft in said bore of said expandable and compressible coupler;

(d) substantially securing said expandable and compressible coupler to said drive shaft and to said cleaning roller so that said cleaning roller rotates with said drive shaft to substantially prevent removal of said drive shaft from said cleaning roller;

(e) providing said expandable and compressible coupler having a first segmented sleeve and a second segmented sleeve, said first segmented sleeve positioned within said second segmented sleeve, said bore of said expandable and compressible coupler extending through said first segmented sleeve;

(f) providing said first segmented sleeve having an externally threaded part and an externally tapered part with movable arc-shaped segments, said second segmented sleeve having a threaded fastening part and an expandable part, said tapered part being tapered outwardly and away from said threaded fastening part;

(g) wherein the step of positioning said expandable and compressible coupler further includes exposing said threaded fastening part within said bore of said cleaning roller for easy and convenient access by a user so that the user can substantially secure said coupler to said drive shaft and to said cleaning roller;

(h) wherein the step of substantially securing said expandable and compressible coupler further includes threading said threaded fastening member toward said tapered part thus effecting expanding of said expandable part securely against a wall forming said bore of said cleaning roller and compressing said tapered part securely about said drive shaft such that said rotatable member rotates with said drive shaft; and (i) wherein the step of substantially securing said expandable and compressible coupler also includes preventing removal of said drive shaft from said cleaning roller by substantially engaging said expandable and compressible coupler within said bore of said cleaning roller and by substantially clamping or engaging said expandable and compressible coupler about said drive shaft.

* * * * *